United States Patent [19]

Schorr

[11] 4,159,831

[45] Jul. 3, 1979

[54] MOBILE EXTRA DISPLAY CONTAINER

[75] Inventor: Frederick D. Schorr, Decatur, Ga.

[73] Assignee: The Coca-Cola Company, Atlanta, Ga.

[21] Appl. No.: 860,646

[22] Filed: Dec. 14, 1977

[51] Int. Cl.² .............................................. B62B 5/00
[52] U.S. Cl. ................................. 280/79.3; 211/49 D
[58] Field of Search .............. 280/179 R, 79.3; 108/2, 108/6; 211/49 R, 49 D, 49 S

[56] References Cited

U.S. PATENT DOCUMENTS

| | | | |
|---|---|---|---|
| 2,917,180 | 12/1959 | Snyder | 211/49 S |
| 3,045,831 | 7/1962 | Pendergrast, Jr. et al. | 211/49 S |
| 3,137,251 | 6/1964 | Pendergrast, Jr. | 211/49 S X |
| 3,161,158 | 12/1964 | Lurey | 108/2 |
| 3,616,938 | 11/1971 | Larchmont et al. | 108/2 X |
| 3,643,808 | 2/1972 | Ryan | 211/49 D |

Primary Examiner—Richard A. Bertsch
Assistant Examiner—Norman L. Stack, Jr.
Attorney, Agent, or Firm—W. Dexter Brooks

[57] ABSTRACT

A mobile extra display cart is described. The cart includes a plurality of vertically adjustable shelves which slide in two vertical tracks located on the back wall of the cart. The plurality of vertically adjustable shelves are designed to pivot upwardly against the back of the cart when the stacked products are removed from the respective shelves. To facilitate the use of the mobile extra display cart as a delivery cart for the stacked products, each respective shelf is molded from plastic and contains an upper and lower lip to keep the stacked products from sliding off the shelves. In addition, there is provided a top cap which is adjustable in the vertical tracks and is hinged at the back of the cart. The top cap is designed to pivot downwardly covering the top layer of the stacked products and in combination with a pair of straps joined together in a Y configuration, the cap is maintained in compression with the stacked products to prevent them from falling out from between the shelves.

10 Claims, 5 Drawing Figures

MOBILE EXTRA DISPLAY CONTAINER

BACKGROUND OF THE INVENTION

1. Field of the Invention

The present invention relates to a mobile extra display cart which is designed for transporting stacked products from a production facility to a retail outlet for displaying the stacked products in the retail outlet after delivery. The display cart contains a plurality of vertically adjustable shelves which are molded to include an upper and lower lip to keep the stacked products from sliding off the shelves. In addition, the mobile extra display cart includes a top cap which may be pivoted downwardly to cover the top layer of the stacked products and in combination with a pair of straps joined together in a Y configuration, the cap is maintained in compression with the load to prevent the stacked products from falling out from between the shelves.

2. Description of the Prior Art

Many exemplary merchandising racks for displaying bottled, canned, or other goods are illustrated in the prior art.

For example, the patent issued to Williams, U.S. Pat. No. 3,528,558, discloses a stationary display rack which includes a plurality of inclined U-shaped members 22 for retaining a case of canned goods.

The patent issued to Lesley, U.S. Pat. No. 3,612,288, and the patent issued to Taber, U.S. Pat. No. 2,852,143, disclose stationary display racks which include either hinged or flexible, rollable shelves.

The following patents issued to Patterson, U.S. Pat. No. 2,908,395, Abrams, U.S. Pat. No. 2,928,551, and McAleenan, U.S. Pat. No. 3,616,938, illustrate stationary display racks which include a plurality of shelves which may be pivoted upwardly after all of the individual articles are removed from the respective shelves.

The patent issued to Patterson, U.S. Pat. No. 2,637,445, illustrates a movable display rack for bottled goods which includes a plurality of tray-frames 11. The tray-frames 11 function as separators between the tiers of goods disposed on the racks and are hinged to the back-frame 5.

The patent issued to Lurey, U.S. Pat. No. 3,161,158, discloses a movable display rack which includes a plurality of vertically adjustable shelves 47. The vertically adjustable shelves 47 are designed to be pivoted upwardly after the product positioned on the shelves is removed therefrom.

Another prior art storage and display rack is disclosed by the Prevette et al patent, U.S. Pat. No. 2,716,495. The Prevette et al patent discloses a movable storage and display cart which includes a plurality of shelves 18 that are designed to be pivoted upwardly after the product is removed therefrom.

The display racks of each of the above patents suffers from disadvantages which are solved by the apparatus of the present invention.

The present invention sets forth a novel combination of a movable display rack which includes a plurality of vertically adjustable shelves that are designed to include an upper and lower lip to keep the stacked products from sliding off the shelves. In addition, the present invention includes a top cap which is also adjustable in vertical tracks and is hinged at the back of the cart. The top cap can swing downwardly covering the top layer of the stacked products and in combination with a pair of straps joined together in a Y configuration, the cap is maintained in compression with the load to prevent the stacked products from falling out from between the shelves.

SUMMARY OF THE INVENTION

It is an object of the present invention to provide a mobile display cart which is designed for transporting stacked products from a production facility to a retail outlet and for displaying the stacked products in the retail outlet after delivery.

Another object of the present invention is to provide a mobile display cart which includes a plurality of shelves that are vertically adjustable relative to each other to accommodate various size products thereon.

A further object of the present invention is to provide a mobile display cart wherein the vertically adjustable shelves are molded to include an upper and lower lip to retain the stacked products thereon thus preventing the products from sliding off the shelves.

A still further object of the present invention is to provide a mobile display cart which includes a top cap that is designed to swing down and cover the top layer of the stacked products and in combination with a pair of straps joined together in a Y configuration the cap is maintained in compression with the load to prevent the stacked products from falling out from between the shelves.

Another object of the present invention is to provide a mobile display cart which may be used in a retail outlet for displaying a stacked product. The product is positioned on spring-loaded shelves so that when the last unit of the product is removed from the shelf it is pivoted upwardly thus providing access to the shelf below.

A still further object of the present invention is to provide a mobile display cart which may readily be used to transport a product from a production facility to a retail outlet and for displaying the product at the retail outlet. In addition, the mobile display cart may readily be employed to transport used or empty containers which are being returned from the retail outlet to the production facility.

These and other objects of the present invention are fulfilled by constructing a mobile display cart which includes a plurality of vertically adjustable shelves which slide in two vertical tracks located on the back wall of the cart. The vertically adjustable shelves are spring-loaded to pivot the shelves upwardly after the last unit of product is removed from the shelf. To facilitate the use of the mobile display cart as a delivery cart for the stacked products, each shelf is molded to include an upper and lower lip to retain the stacked products. In addition, there is provided a top cap which is adjustable in the vertical tracks and is hinged at the back of the cart. The top cap pivots downwardly to cover the top layer of the stacked products and in combination with a pair of straps joined together in a Y configuration, the cap is maintained in compression with the load to prevent the stacked products from falling out from between the shelves.

Further scope of applicability of the present invention will become apparent in the detailed description given hereinafter. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
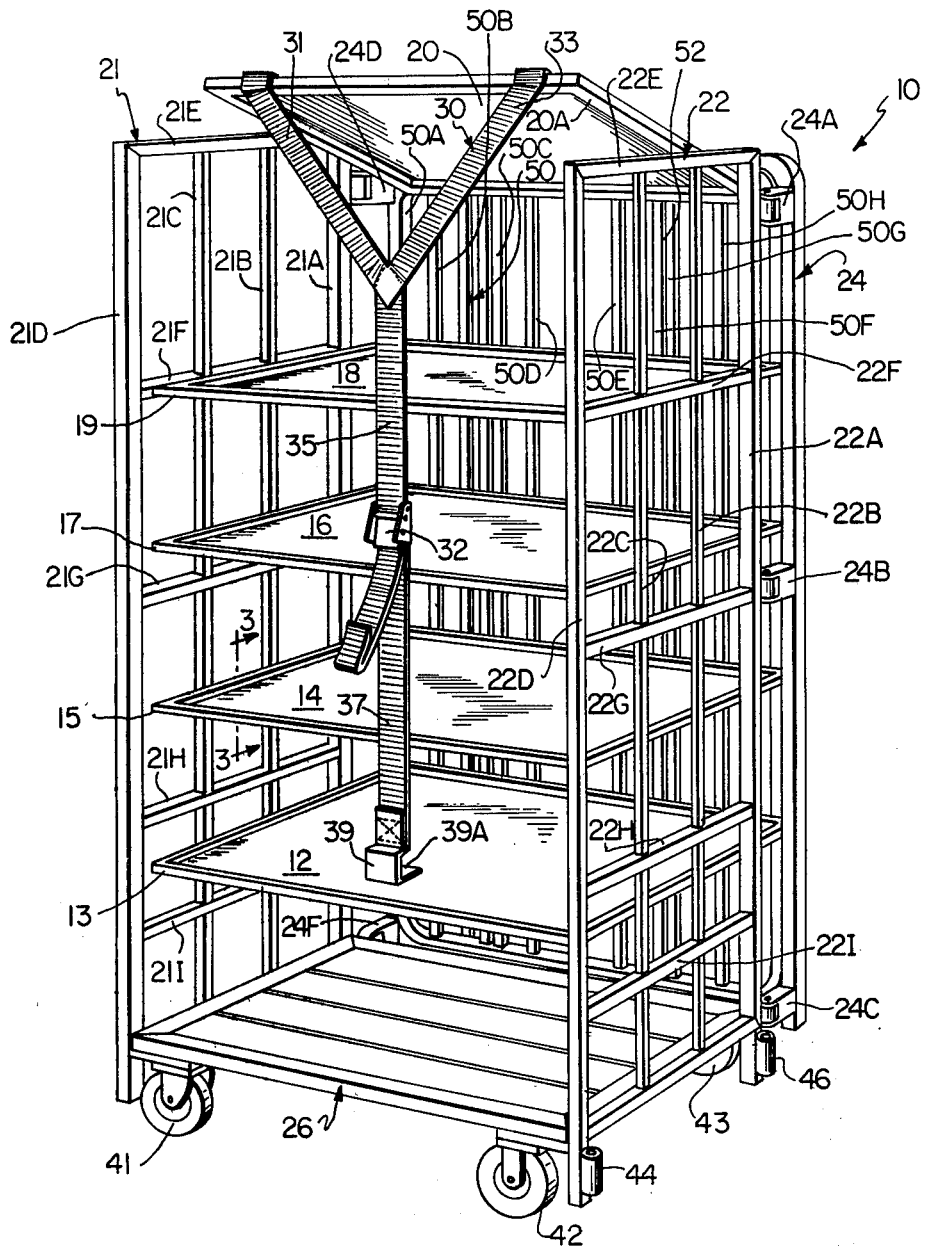
FIG. 1 is a perspective view of the mobile display cart of the present invention.

Referring in detail to FIG. 1, there is illustrated a perspective view of the mobile display cart generally indicated by numeral 10. The mobile display cart 10 includes side walls 21 and 22. The side wall 21 includes a plurality of vertical frame members 21A, 21B, 21C and 21D. In addition, the side wall 21 is constructed to include a plurality of horizontal frame members 21E, 21F, 21G, 21H and 21I.

The side wall member 22 is substantially similar to the side wall member 21 and includes a plurality of vertical frame members 22A, 22B, 22C and 22D. In addition, the side wall member 22 includes a plurality of horizontal frame members 22E, 22F, 22G, 22H and 22I. Positioned adjacent the lower portion of the side wall member 22 are two bushings 44 and 46 used to lock the cart in position into a transport vehicle by suitable locking pins.

Figure 4:
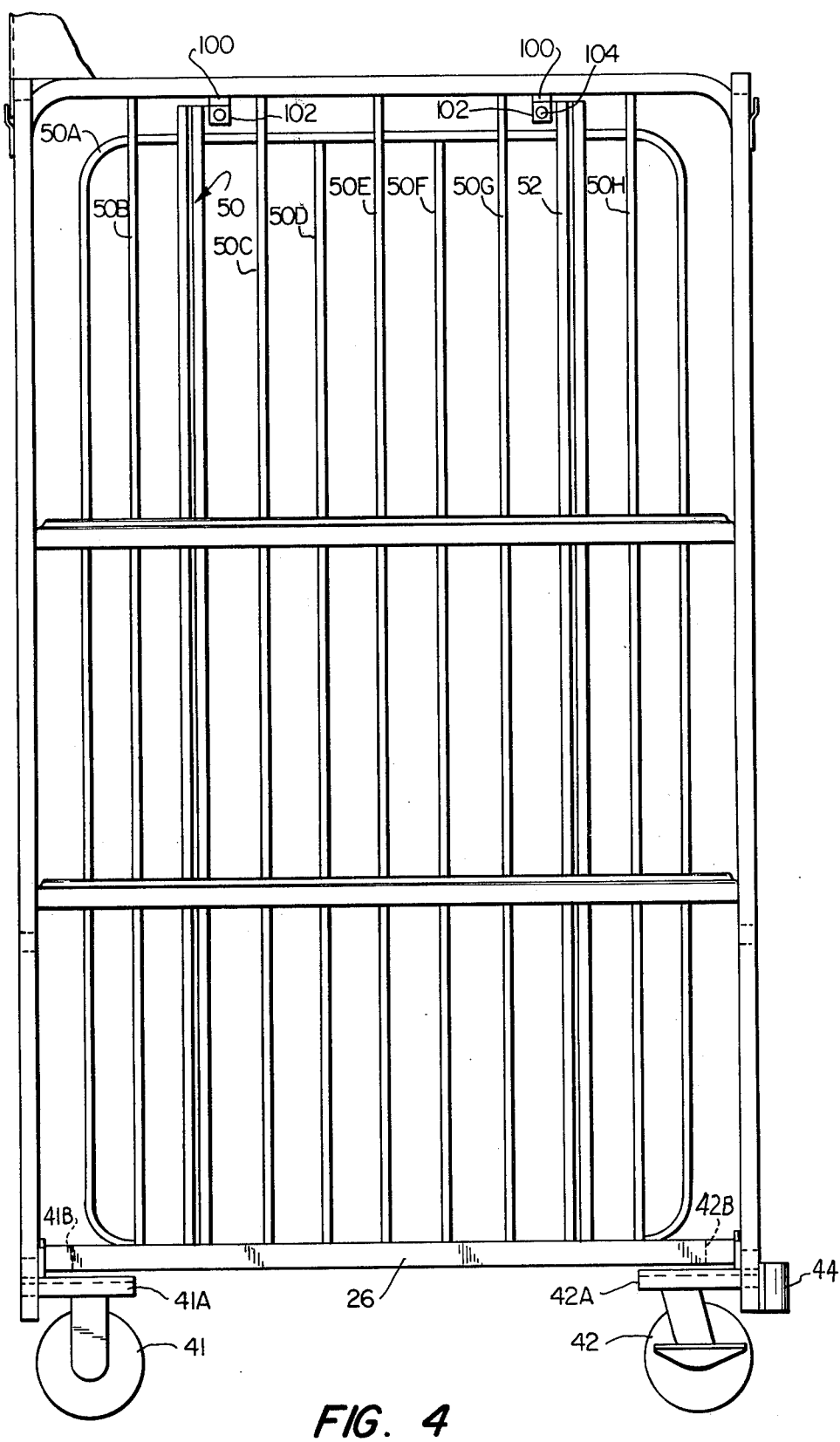
FIG. 4 illustrates the details of the back wall assembly of the cart of the present invention.

Referring in detail to FIG. 4 the mobile display cart 10 includes a back wall 24 which is constructed to include a plurality of vertical frame members 50A, 50B, 50C, 50D, 50E, 50F, 50G and 50H. In addition, the back wall 24 includes two vertical tracks 50 and 52. The vertical tracks 50 and 52 support the vertically adjustable shelves. The back wall 24 includes a plurality of outwardly projecting hinges 24A, 24B, 24C, 24D and 24F which are designed for pivotal connection of the back wall 24 to the side walls 21 and 22.

The back wall 24 includes a main assembly and a removable subassembly on which the tracks 50, 52 are mounted, so that when the subassembly is removed the cart may be used for stacking beverage cases in a conventional manner without the shelf assembly. As illustrated in FIG. 4, the main back wall which is an integral part of the cart, comprises vertical frame members 50B, 50C, 50E, 50G, and 50H. The removable subassembly includes rectangular outer frame member 50A, tracks 50, 52 and frame members 50D, 50F. The subassembly is removably secured to the main back wall assembly by brackets 100 and 102 rigidly affixed to the main and subassemblies, respectively. The brackets 100, 102 may be held together by a wing nut and bolt assembly 104.

Figure 5:
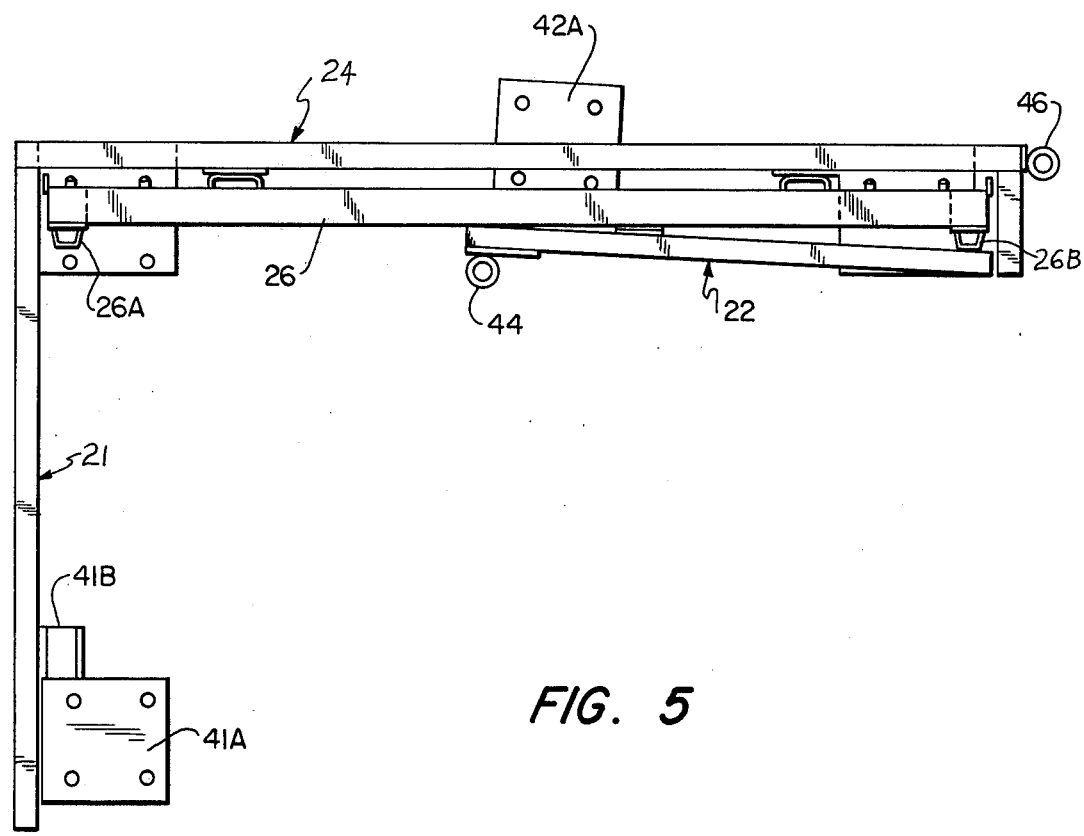
FIG. 5 illustrates how the cart of the present invention may be folded into a flat, compact package.

The mobile display cart 10 includes a bottom tray 26 which is hinged to the rear wall 24 to enable the tray 26 to fold back against the rear wall. In addition, firmly affixed to the side walls are a plurality of wheels 41, 42 and 43 which provide the cart with mobility. With the bottom tray 26 folded against the rear wall 24, the side walls may also be folded back against rear wall 24. This feature is illustrated in FIG. 5. As illustrated therein bottom tray 26 is folded back against rear wall 24 and side wall 22 is folded thereover. Side wall 21 would then be pivoted in a like manner to side wall 22 into contact with bottom tray 26. Thus, the entire cart assembly may be folded into a compact substantially flat package for storage or transportation to points of use.

Referring further to FIGS. 4 and 5 wheels or casters 41, 42 are mounted on caster support plates 41A, 42A coupled to side frames 21 and 22, respectively. Also coupled to the side walls adjacent caster support plates are slotted channel members 41B, 42B. These channel members receive projections 26A, 26B on the bottom of tray 26, when tray 26 is folded down into a horizontal position and side walls 21, 22 are fully extended. Thus, side walls 21, 22 are locked in place by channels 41B, 42B and projections 26A, 26B when tray 26 is disposed in the horizontal position of FIGS. 1 and 4.

The mobile display cart of the present invention includes a plurality of vertically adjustable shelves 12, 14, 16 and 18 which are adjustably connected to the vertical tracks 50 and 52. Each vertically adjustable tray 12, 14, 16 and 18 includes a lip 13, 15, 17 and 19, respectively, which projects both upwardly and downwardly with respect to the horizontal portion of the shelf surface. Containers, such as bottles or cans, would fill the shelves 26, 12, 14, 16 and 18 and the containers positioned adjacent the edges of the shelves would have their bottom portion in engagement with the upwardly projecting lip of the shelf on which they were positioned and would have their upper portion thereof in engagement with the downwardly projecting lip of an adjacent shelf. The lips 13, 15, 17, 19 and 20A are designed to retain the containers or products on their respective shelves and prevent the stacked product from sliding off their respective shelves.

In operation, an individual would position the product, such as bottles or cans, on the lower shelf 26 and thereafter pivot downwardly the adjacent shelf 12. The shelf 12 would be adjusted vertically relative to the shelf 26 so that the downwardly projecting portion of the lip 13 would engage the top portion of the product. Thereafter, a plurality of products would be positioned on the shelf 12 and subsequently the shelf 14 would be pivoted downwardly. The individual would adjust the height of the shelf 14 relative to the shelf 12 so that the downwardly projecting portion of the lip 15 would engage the top of the product. Upon filling the shelf 14 with a plurality of products, the individual would pivot downwardly the shelf 16 and adjust it in the same manner as he has adjusted the shelves 12 and 14. Upon filling the shelf 16 the individual would pivot downwardly the shelf 18 and adjust it relative to the shelf 16 in the same manner as discussed above. Finally, upon filling the shelf 18, the individual would pivot downwardly the top member or cap 20 and adjust its height relative to the shelf 18 so that the downwardly projecting portion of the lip 20A will engage the top portion of the product. Subsequent to pivoting and adjusting the top cap 20, the individual would adjust the strap 37 so that the opening 39A of the clasp 39 is adjacent the lower shelf 26. Upon sliding the clasp 39 on to the lower shelf 26, the free end of the strap 37 is pulled so as to tighten the strap and thus compress the top member or cap 20 relative to the shelves of the mobile display cart.

It should be readily understood, that by tightening the strap 37 so as to compress the top member or cap 20 relative to the shelves of the mobile display cart, that the products contained thereon are firmly retained in place and would be prevented from sliding off of their respective shelves.

Referring to FIG. 1, a linkage means 30 including a pair of straps 31 and 33 are connected at the top portion thereof to the top member or cap 20 and are joined together at the bottom portion to a downwardly projecting strap 35. The straps 31, 33 and 35 form a Y configuration. Connected to the lower portion of the strap 35 is a buckle 32 which is designed to releasably retain the belt member 35 relative to the belt member 37. As discussed above, after the opening 39A of the clasp 39 is positioned on the bottom shelf 26 and the free end of the belt 37 is tightened, the buckle 32 would firmly affix the relative positioning of the strap 35 and the strap 37.

The mobile display cart of the present invention is supported on a plurality of wheels 41, 42 and 43. After the cart is filled with a plurality of products, it may readily be rolled to a desired location. Although the present invention may readily be rolled to various locations, it is to be understood that a forklift may be positioned beneath the lower tray 26 and may lift the cart to transport it to a desired location.

Figure 2:
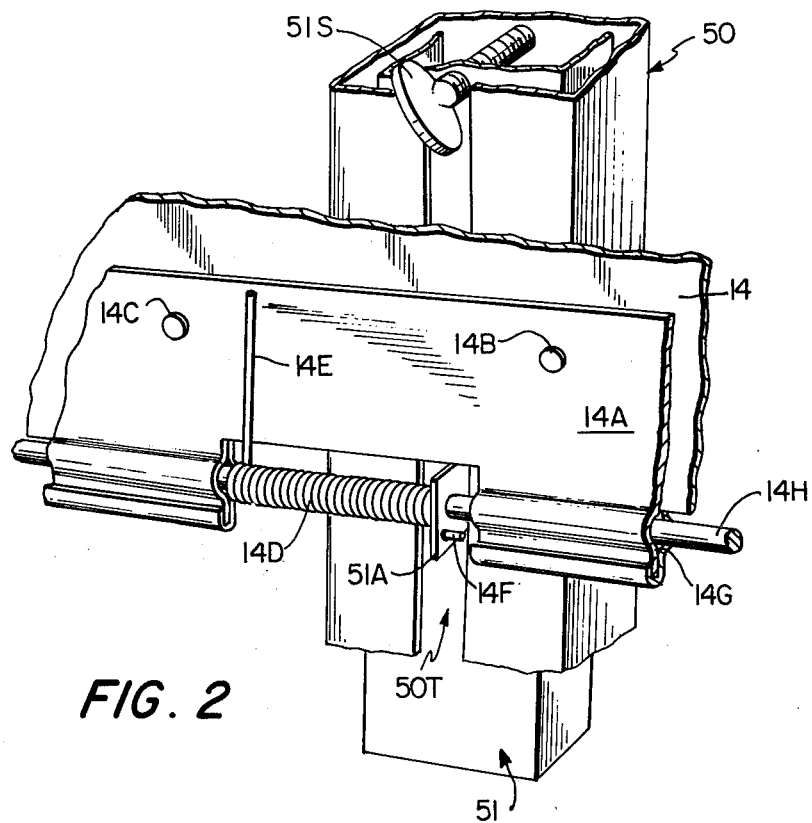
FIG. 2 illustrates the hinged construction of a shelf after it has pivoted upwardly to provide access to the shelf below.

Referring in detail to FIG. 2, there is illustrated a shelf 14 which is pivoted into engagement with the back wall of the cart. As previously discussed, the shelf 14 is spring-loaded to pivot upwardly after the last unit of a product is removed therefrom. A mounting member 14A is affixed to the shelf 14 by attaching members 14B and 14C. The mounting member 14A includes an opening 14G through which the axle 14H is rotatably received. As previously discussed, the shelves are spring-loaded to pivot upwardly against the back of the cart when the stacked products are removed from the respective shelves. The spring-loaded mechanism consists of a torsion spring 14D which includes outwardly projecting arms 14E and 14F. The outwardly projecting arm 14E engages the mounting member 14A to spring bias the shelf 14. The outwardly projecting arm 14F is received within an opening in the projection 51A which is attached to the mounting bracket 51. It is to be understood, that since the outwardly projecting arm 14F is fixed relative to the projection 51A that the outwardly projecting arm 14E will rotate and thus pivot the shelf 14 upwardly after the stacked products are removed from the shelf.

The mobile display cart of the present invention includes two vertical tracks 50 and 52 which are part of the back wall subassembly discussed hereinbefore. FIG. 2 illustrates the vertical track 50 which is rectangular in shape and includes a slot 50T. The bracket 51 includes the projection 51A which rotatably receives the axle 14H and thus supports the mounting member 14A and the shelf 14. Bracket 51 is substantially U-shaped and accommodates the setscrew 51S. The slot 50T permits the U-shaped bracket 51 to be reciprocated vertically to thereby adjust the shelf 14 relative to the vertical track 50. It is to be understood, that the same adjustment must be made with respect to the vertical track 52 which is displaced from the vertical track 50. Upon reciprocating the U-shaped bracket 51 to the correct vertical location, the setscrew 51S is rotated to thereby force the front wall of the U-shaped bracket 51 inwardly thus frictionally engaging the front wall of the mounting bracket with the front wall of the vertical track 50. The frictional engagement of the mounting bracket 51 with respect to the vertical track 50 affixes the shelf 14 relative to the vertical track 50.

Figure 3:
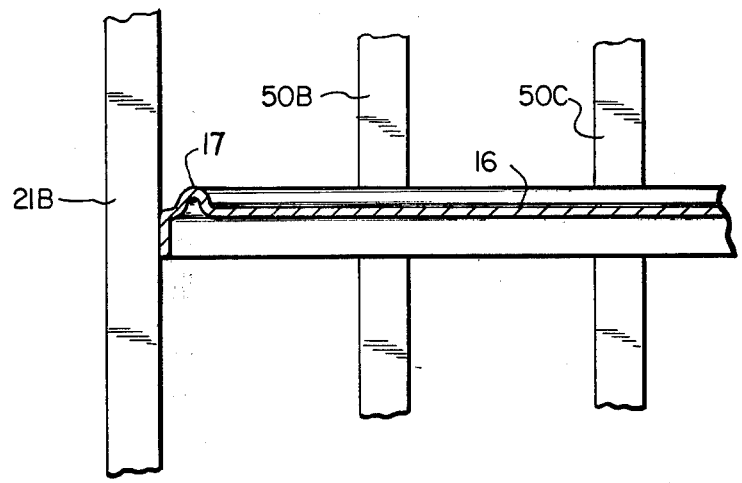
FIG. 3 illustrates a cross-sectional view of a shelf of the present invention.

Referring in detail to FIG. 3, there is illustrated a partial cross section of the shelf 16. As previously discussed, the shelf 16 includes a lip 17. The upwardly projecting portion of the lip 17 is designed to engage the lower portion of a product positioned on the shelf 16. The downwardly projecting portion of the lip 17 is designed to engage the upper portion of a product positioned on the shelf 14.

In addition, FIG. 3 illustrates the vertical frame members 50B and 50C of the rear wall 24 of the mobile display cart. Further, FIG. 3 clearly shows the vertical member 21D of the side wall 21.

Although particular reference has been made throughout the specification to molding the shelves from a plastic material, it should be understood that the shelves may be constructed from any material that is suitable for the intended purpose. In addition, the shelves may be manufactured by molding, stamping, extruding or any other acceptable process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile display cart comprising:
  a movable support including at least one track extending vertically thereof;
  a plurality of individually, vertically adjustable shelves for supporting and displaying a plurality of products thereon, said shelves being spring-loaded so as to pivot upwardly against said track after all products are removed from a respective shelf;
  means for mounting said shelves for movement in said at least one vertical track;
  retaining means for each shelf for preventing said products from sliding off of said each shelf;
  a vertically adjustable top member mounted for movement in said track;
  linkage means coupled to a lower portion of said frame and to said top member; and
  means for adjusting said linkage means for compressing all of said shelves together to secure said products between said shelves.

2. A mobile display cart according to claim 1, wherein said linkage means is a pair of straps adjustable relative to each other.

3. A mobile display cart according to claim 1, wherein said retaining means includes a lip positioned adjacent the edge portions of each of said shelves which includes an upwardly projecting portion and a downwardly projecting portion.

4. A mobile display cart according to claim 3, wherein said lip is integrally formed with said each shelf.

5. A mobile display cart according to claim 1, wherein means for mounting includes a bracket with one portion slidable within said track and another portion pivotally connected to a respective shelf.

6. A mobile display cart according to claim 1, wherein the frame member includes a plurality of wheels mounted on the lower portion thereof.

7. A mobile display cart according to claim 1 wherein said movable support further includes a back wall on which said at least one track is mounted, a pair of side walls hinged to said back wall, and a bottom wall hinged to said back wall, whereby said side walls and bottom wall may be pivoted against said back wall.

8. A mobile display cart according to claim 7, wherein said bottom wall and said side walls include means for releasably coupling said bottom wall and side walls together when said bottom wall is substantially perpendicular to said back wall.

9. A mobile display cart according to claim 1, wherein said movable support includes a main frame and a subassembly on which said at least one track is mounted and means for releasably securing said subassembly to said main frame.

10. A mobile display cart comprising:
a main frame assembly;
a sub-frame assembly including at least one vertical track;
means for removably securing said sub-frame assembly to said main frame assembly;
a plurality of individually, vertically adjustable shelves for supporting and displaying a plurality of products thereon, said shelves being spring-loaded so as to pivot upwardly against said track after all products are removed from a respective shelf;
means for mounting said shelves for movement in said at least one vertical track;
retaining means for each shelf for preventing said products from sliding off of said each shelf;
a vertically adjustable top member mounted for movement in said track;
strap means coupled to a lower portion of said frame and to said top member; and
means for adjusting the strap means to provide tension for compressing all of said shelves together to secure said products between said shelves.

* * * * *